US012573428B2

(12) United States Patent
Deng et al.

(10) Patent No.: US 12,573,428 B2
(45) Date of Patent: Mar. 10, 2026

(54) VIDEO PROCESSING METHOD, APPARATUS, AND ELECTRONIC DEVICE

(71) Applicant: Beijing Zitiao Network Technology Co., Ltd., Beijing (CN)

(72) Inventors: Xinliang Deng, Beijing (CN); Jinmin Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 31 days.

(21) Appl. No.: 18/570,615

(22) PCT Filed: Dec. 5, 2023

(86) PCT No.: PCT/CN2023/136577
§ 371 (c)(1),
(2) Date: Dec. 14, 2023

(87) PCT Pub. No.: WO2024/140069
PCT Pub. Date: Jul. 4, 2024

(65) Prior Publication Data
US 2025/0095688 A1 Mar. 20, 2025

(30) Foreign Application Priority Data

Dec. 29, 2022 (CN) .......................... 202211713263.8

(51) Int. Cl.
*G11B 27/031* (2006.01)
(52) U.S. Cl.
CPC .................................. *G11B 27/031* (2013.01)
(58) Field of Classification Search
CPC ................................................... G11B 27/031
See application file for complete search history.

(56) References Cited

U.S. PATENT DOCUMENTS

| | | | | |
|---|---|---|---|---|
| 6,154,600 A | 11/2000 | Newman et al. | | |
| 2006/0045475 A1* | 3/2006 | Watanabe | ............ | G11B 27/105 |

(Continued)

FOREIGN PATENT DOCUMENTS

| | | |
|---|---|---|
| CN | 108040288 A | 5/2018 |
| CN | 110891192 A | 3/2020 |

(Continued)

OTHER PUBLICATIONS

Japan Patent Application No. 2025-520101; Decision to Grant; dated Jan. 13, 2026; 5 pages.

*Primary Examiner* — Mishawn N. Hunter
(74) *Attorney, Agent, or Firm* — BakerHostetler

(57) ABSTRACT

The present disclosure provides a video processing method, apparatus and electronic device. The method comprises: determining a plurality of video track segments on a plurality of video editing tracks on a video editing interface; determining cache priorities of the track segment image frames of the plurality of video track segments, according to whether the plurality of video editing tracks are located in the display area of the video editing interface, and track segment image frames of the plurality of video track segments within a track timeline range of the display area; determining a target track segment image frame from the track segment image frames of the plurality of video track segments based on the cache priorities and a cache frame configuration parameter, and caching the target track segment image frame. The efficiency of video clipping is improved.

20 Claims, 8 Drawing Sheets

(56)　　　　　　References Cited

U.S. PATENT DOCUMENTS

| 2013/0195427 | A1 | 8/2013 | Sathish |
| 2022/0191558 | A1 | 6/2022 | Kim et al. |

FOREIGN PATENT DOCUMENTS

| CN | 111263211 | A | 6/2020 |
| CN | 111538489 | A | 8/2020 |
| CN | 111669645 | A | 9/2020 |
| JP | 2001-503932 | A | 3/2001 |
| JP | 2022-546764 | A | 11/2022 |

* cited by examiner

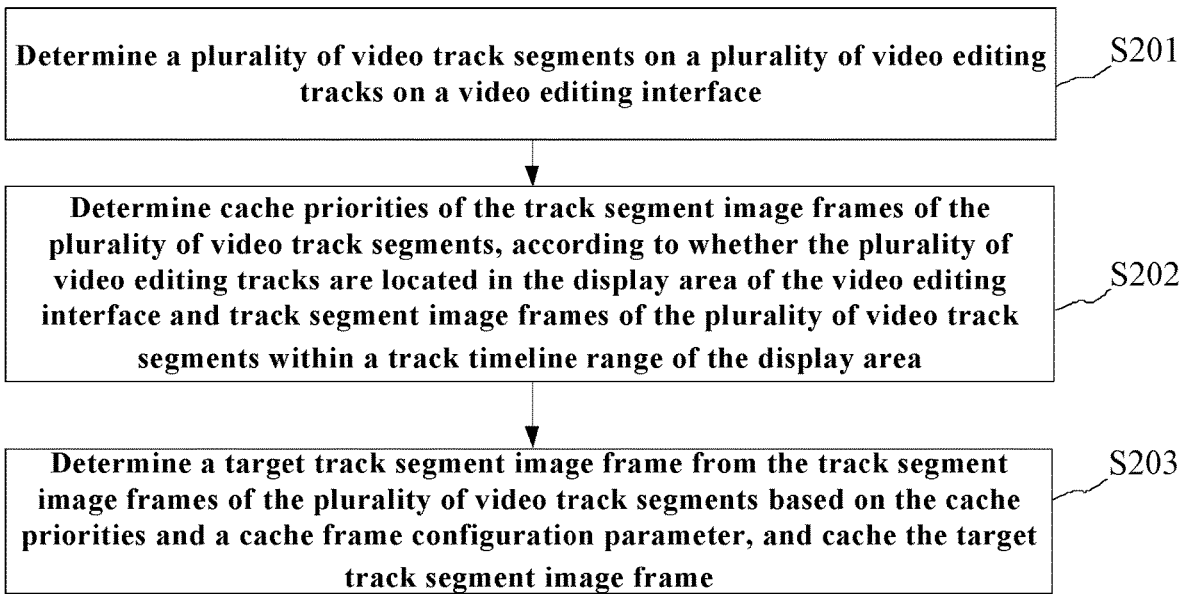

| Determine a plurality of video track segments on a plurality of video editing tracks on a video editing interface | S201 |

| Determine cache priorities of the track segment image frames of the plurality of video track segments, according to whether the plurality of video editing tracks are located in the display area of the video editing interface and track segment image frames of the plurality of video track segments within a track timeline range of the display area | S202 |

| Determine a target track segment image frame from the track segment image frames of the plurality of video track segments based on the cache priorities and a cache frame configuration parameter, and cache the target track segment image frame | S203 |

Fig. 2

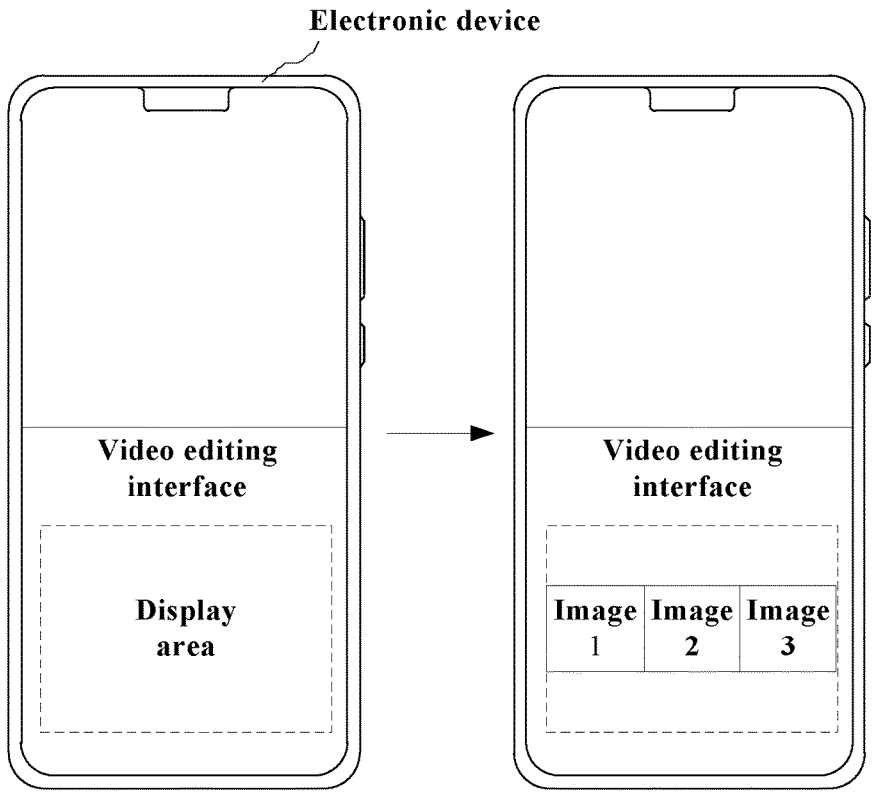

Electronic device

Video editing interface

Display area

Video editing interface

| Image 1 | Image 2 | Image 3 |

Fig. 3

Electronic device

Electronic device

Video editing interface

Display area

| Image 1 | Image 2 | Image 3 | | Image 7 | Image 8 | Image 9 |

Obtain a number of occurrences corresponding to each target track segment image frame in the memory — S701

Manage the target track segment image frame cached in the memory according to the number of occurrences — S702

VIDEO PROCESSING METHOD, APPARATUS, AND ELECTRONIC DEVICE

CROSS REFERENCE TO RELATED APPLICATION(S)

The present application is a national stage application filed under 35 U.S.C. 371 based on International Patent Application No. PCT/CN2023/136577, filed on Dec. 5, 2023, which claims priority to the Chinese patent application No. 202211713263.8, filed on Dec. 29, 2022, with the China National Intellectual Property Administration, and entitled "Video Processing Method, Apparatus, and Electronic Device", both the entire disclosure of which are incorporated herein by reference in its entirety their entireties.

FIELD

Embodiments of the present disclosure relate to the technical field of video processing, and particularly to a video processing method, apparatus and electronic device.

BACKGROUND

Multiple video editing may process multiple video materials, so an editing area of an electronic device may display video frames of multiple video materials, and the electronic device needs to cache the video frames of the multiple video materials in a memory.

Currently, the electronic device may cache the video frames of each video material in the memory according to the number of caches preset by an editing application. For example, if the electronic device edits 5 video materials through a clipping application with a preset number of caches 30, the electronic device may cache 150 video frames in the memory with 30 video frames per video material. However, according to the above-mentioned method, for each video material, the electronic device can only cache a fixed number of video frames in the video material; when there are more video materials, occupation of the memory of the electronic device is large, so that the video clipping process is stuck, thus causing a low efficiency of video clipping.

SUMMARY

The present disclosure provides a video processing method, apparatus and electronic device for solving the technical problem of inefficient video clipping in the prior art.

In a first aspect, the present disclosure provides a video processing method, comprising:

determining a plurality of video track segments on a plurality of video editing tracks on a video editing interface;

determining cache priorities of the track segment image frames of the plurality of video track segments, according to whether the plurality of video editing tracks are located in a display area of the video editing interface and the track segment image frames of the plurality of video track segments within a track timeline range of the display area; wherein the track segment image frames of the video track segments are displayed at track timeline positions corresponding to the track segment image frames in the video track segments;

determining a target track segment image frame from the track segment image frames of the plurality of video track segments based on the cache priorities and a cache frame configuration parameter, and caching the target track segment image frame.

In a second aspect, the present disclosure provides a video processing apparatus comprising a first determination module, a second determination module, a third determination module and a caching module, wherein:

the first determination module is used to determine a plurality of video track segments on a plurality of video editing tracks on a video editing interface;

the second determination module is used to determine cache priorities of the track segment image frames of the plurality of video track segments, according to whether the plurality of video editing tracks are located in a display area of the video editing interface and the track segment image frames of the plurality of video track segments within a track timeline range of the display area; wherein the track segment image frames of the video track segments are displayed at track timeline positions corresponding to the track segment image frames in the video track segments;

the third determination module is used to determine a target track segment image frame from the track segment image frames of the plurality of video track segments according to the cache priorities and a cache frame configuration parameter;

the caching module is used to cache the target track segment image frame.

In a third aspect, embodiments of the present disclosure provide an electronic device, comprising: a processor and a memory;

the memory stores computer-executable instructions;

the processor executes computer-executable instructions stored in the memory to cause the at least one processor to perform the video processing method according to the above first aspect and various possibilities of the first aspect.

In a fourth aspect, embodiments of the present disclosure provide a computer-readable storage medium on which computer-executable instructions stored, the computer-executable instructions when executed by a processor, implement the video processing method according to the above first aspect and various possibilities of the first aspect.

In a fifth aspect, embodiments of the present disclosure provide a computer program product comprising a computer program which, when executed by a processor, implements the video processing method according to the above first aspect and various possibilities of the first aspect.

The present disclosure provides a video processing method, apparatus and electronic device. The electronic device determines a plurality of video track segments on a plurality of video editing tracks on a video editing interface; determines cache priorities of the track segment image frames of the plurality of video track segments, according to whether the plurality of video editing tracks are located in a display area of the video editing interface and the track segment image frames of the plurality of video track segments within a track timeline range of the display area; wherein the track segment image frames of the video track segments are displayed at track timeline positions corresponding to the track segment image frames in the video track segments; determines a target track segment image frame from the track segment image frames of the plurality of video track segments based on the cache priorities and a cache frame configuration parameter, and caching the target track segment image frame. According to the above method, since the electronic device may cache a plurality of track segment image frames according to the priorities between the plurality of track segment image frames. Therefore, the electronic device has a sequential order upon caching the track segment image frames, and the electronic device may flexibly cache the track segment image frames to improve the flexibility of caching; furthermore, the sticking phenomenon caused by large occupation of the memory of the electronic device may also be avoided in conjunction with the cache frame configuration parameter, thereby improving the efficiency of the video clipping.

BRIEF DESCRIPTION OF THE DRAWINGS

To describe technical solutions in embodiments of the present disclosure or prior art more clearly, the figures for describing the embodiments or prior art will be introduced briefly below. Obviously, the figures in the following depictions illustrate some embodiments of the present disclosure, and those skilled in the art may obtain other figures according to these figures without making any inventive efforts.

FIG. 2 is a flow chart of a video processing method provided by an embodiment of the present disclosure;

FIG. 3 is a schematic diagram of a first track segment image frame provided by an embodiment of the present disclosure;

DETAILED DESCRIPTION OF EMBODIMENTS

Figure 1:
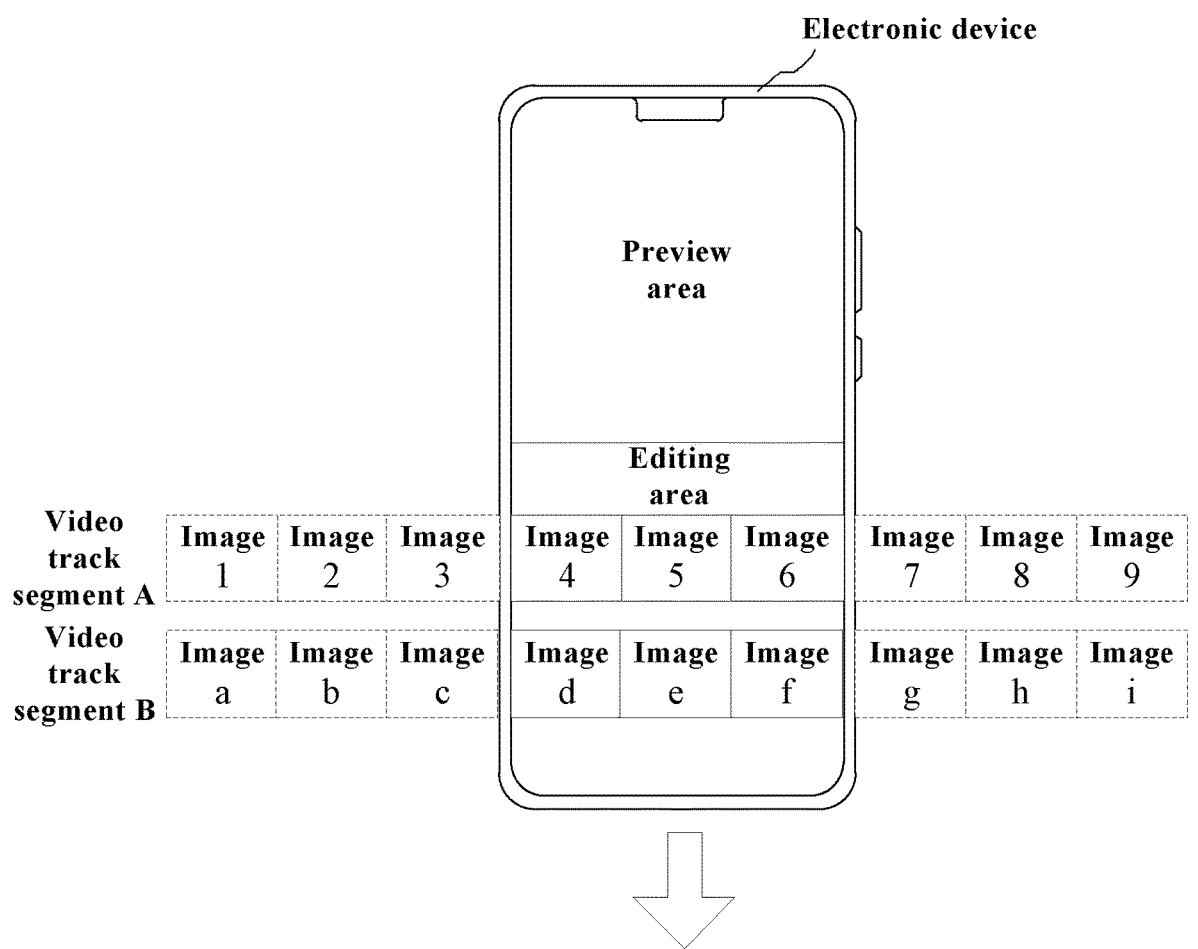
FIG. 1 is a schematic diagram of an application scenario provided by an embodiment of the present disclosure.

Exemplary embodiments will be described in detail here, and examples thereof are illustrated in the figures. Where the following description refers to the figures, like numbers in different figures indicate the same or similar elements, unless otherwise indicated. The implementation modes described in the following exemplary embodiments do not represent all implementation modes consistent with the present disclosure. Rather, they are merely examples of apparatus and methods consistent with certain aspects of the present disclosure, as detailed in the appended claims.

To facilitate understanding, concepts related to embodiments of the present disclosure are described below.

Electronic device: it is a device with a wireless transceiving function. The electronic device may be deployed on land, including those used in an indoor, outdoor, hand-held, wearable, or vehicle-mounted manner; it may also be deployed on waters (e.g., a ship). The electronic device can be a mobile phone, a tablet computer (Pad), a computer with a wireless transceiving function, a virtual reality (VR) electronic device, an augmented reality (AR) electronic device, a wireless terminal in industrial control, a vehicle-mounted electronic device, and a wireless terminal in self driving; a wireless electronic device in remote medical, a wireless electronic device in smart grid, a wireless electronic device in transportation safety, a wireless electronic device in smart city, a wireless electronic device in smart home, a wearable electronic device, etc. The electronic device to which embodiments of the present disclosure relate may also be referred to as a terminal, a user equipment (UE), an access electronic device, an in-vehicle terminal, an industrial control terminal, a UE unit, a UE station, a mobile station, a remote station, a remote electronic device, a mobile device, a UE electronic device, a wireless Communication means, a UE proxy, or a UE device, etc. The electronic device may also be fixed or mobile.

In the related art, the electronic device may edit a plurality of video materials simultaneously. Since the electronic device needs to display video frames corresponding to the video materials in an editing area, the electronic device may cache the video frames of the plurality of video materials in a memory in advance. Currently, the electronic device may cache video frames of each video material in the memory according to a preset number of caches. For example, if the preset number of caches is 30, the electronic device obtains 30 video frames from each video material and caches the 30 video frames into the memory. However, according to the above-mentioned method, for each video material, the electronic device can only cache a fixed number of video frames in the video material. When there are more video materials, occupation of the memory of the electronic device is large, so that the video clipping process is stuck, thus causing a low efficiency of video clipping.

In order to solve the technical problem in the relevant art, the present disclosure provides a video processing method. The electronic device may determine a plurality of video track segments located on a plurality of video editing tracks on a video editing interface, wherein in response to the video editing tracks being located in a display area, a cache priority of first track segment image frames within a track timeline range of the display area in the video track segments of the video editing tracks is a first priority, in response to the video editing tracks being located in the display area, a cache priority of second track segment image frames not within the track timeline range of the display area in the video track segments of the video editing tracks is a second priority, in response to the video editing tracks being not located in the display area, a cache priority of third track segment image frames within the track timeline range of the display area in the video track segments of the video editing tracks is a third priority, in response to the video editing tracks being not located in the display area, a cache priority of fourth track segment image frames not within the track timeline range of the display area in the video track segments of the video editing tracks is a fourth priority, a target track segment image frame is determined from the track segment image frames of the plurality of video track segments based on the cache priority and a cache frame configuration parameter, and the target track segment image frame is cached. In this way, since there are different priorities among the track segment image frames in the plurality of video track segments, the electronic device has a sequential order upon caching the track segment image frames, thereby improving the flexibility of caching; furthermore, the sticking phenomenon caused by large occupation of the memory of the electronic device may also be avoided in conjunction with the cache frame configuration parameter, thereby improving the efficiency of the video clipping.

Hereinafter, an application scenario of an embodiment of the present disclosure will be described with reference to FIG. 1.

FIG. 1 is a schematic diagram of an application scenario provided by an embodiment of the present disclosure. Referring to FIG. 1, the application scenario comprises an electronic device, video track segment A and video track segment B. A display page of the electronic device comprises a preview area and an editing area, wherein the preview area may display track segment image frames in video track segments. Each of video track segment A and video track segment B comprises a plurality of track segment image frames (the number of track segment image frames is greater than 9). Image 4, image 5 and image 6 of video track segment A and image d, image e and image f of video track segment B are displayed in the editing area of the electronic device.

Referring to FIG. 1, the electronic device may determine images 4-6 in video track segment A and images d-f in video track segment B as track segment image frames to be cached according to a cache frame configuration parameter, and cache three track segment image frames in the video track segment A and three track segment image frames in the video track segment B into a memory. In this way, since the cache frame configuration parameter may indicate an ability of the electronic device to cache the image frames, the electronic device may only cache the track segment image frames in the display area of the editing area in combination with the priorities between the track segment image frames, thereby improving the flexibility of the caching of the track segment image frames, avoiding a large occupation rate of the memory, improving the running speed of the editing application, and thus improving the efficiency of video editing.

The technical solutions of the present disclosure and how the technical solutions of the present disclosure solve the above-mentioned technical problems are described in detail in the following specific embodiments. The following specific embodiments may be combined with each other, and the same or similar concepts or processes might not be repeated in some embodiments. Embodiments of the present disclosure will now be described with reference to the accompanying drawings.

FIG. 2 is a flow chart of a video processing method provided by an embodiment of the present disclosure. Referring to FIG. 2, the method may comprise:

S201: determining a plurality of video track segments on a plurality of video editing tracks on a video editing interface.

A subject implementing the embodiment of the present disclosure may be an electronic device or a video processing apparatus provided in the electronic device. The video processing apparatus may be implemented by software, and the video processing apparatus may also be implemented by a combination of software and hardware, which is not limited by embodiment of the present disclosure.

The video editing interface may be used for video editing. For example, a plurality of video materials may be edited in the video editing interface. Optionally, the video editing tracks are editing tracks for editing video materials. For example, during the clipping process, the electronic device may clip a plurality of video material such that each video material has a corresponding video editing track, and the electronic device may edit the plurality of video materials in the plurality of video editing tracks.

Optionally, the video track segments may be segments of video materials to be edited in the video editing tracks. For example, if the electronic device edits video material A, video material B and video material C, the electronic device may determine that the video editing process comprises a video editing track 1, a video editing track 2 and a video editing track 3, wherein the video editing track 1 comprises track segments corresponding to the video material A, the video editing track 2 comprises track segments corresponding to the video material B, and the video editing track 3 comprises track segments corresponding to the video material C.

S202: determining cache priorities of the track segment image frames of the plurality of video track segments, according to whether the plurality of video editing tracks are located in the display area of the video editing interface, and track segment image frames of the plurality of video track segments within a track timeline range of the display area.

Optionally, the track segment image frames of the video track segments are displayed at track timeline positions in the video track segments corresponding to the track segment image frames. For example, a video track segment may comprise a plurality of track segment image frames. For example, if the track timeline is 10 seconds, each video track segment may be edited within the 10 seconds. For example, the track segment image frames in each video track segment all may have corresponding positions on the track timeline; for any of the video track segments, the track segment image frame A in the video track segment is at the first second of the track timeline, and the track segment image frame B is at the second second of the track timeline; in this case, upon previewing for clipping, the electronic device may display the track segment image frame A when the track timeline plays to the first second, and the electronic device may display the track segment image frame B when the track timeline plays to the second second.

Optionally, the display area of the video editing interface may be the display area of the electronic device during video editing. For example, the video editing process comprises 10 video materials, wherein if the video editing tracks corresponding to 8 video materials may be located in the display area of the video editing interface, the 8 video materials may be displayed in the electronic device; if the video editing tracks corresponding to the remaining 2 video materials are not located in the display area of the video editing interface, the 2 video materials will not be displayed in the electronic device.

Optionally, the track segment image frames within the track timeline of the display area may be track segment image frames that may be displayed in the display area. For example, the track timeline comprises a timeline of the display area; the track segment image frames may be displayed in the display area of the video editing interface if the track segment image frames are within the timeline of the display area, and the track segment image frames may not be displayed in the display area of the video editing interface if the track segment image frames are not within the timeline of the display area.

Optionally, the step of determining cache priorities of the track segment image frames of the plurality of video track segments, according to whether the plurality of video editing tracks are located in the display area of the video editing interface, and track segment image frames of the plurality of video track segments within a track timeline range of the display area has the following four cases:

Case 1: the cache priority of a first track segment image frame is a first priority.

Optionally, in response to the video editing track being located in the display area, the cache priority of the first track segment image frame within the track timeline range of the display area in a video track segment of the video editing track is the first priority. For example, if the video editing track is located in the display area, this indicates that the video track segments of the video editing track may be displayed in the display area of the video editing interface, and furthermore, the first track segment image frame within the track timeline range of the display area in the video track segments of the video editing track may be image frames displayed in the display area. Therefore, the cache priorities of such type of track segment image frames may be the first priority.

Next, a first track segment image frame will be described with reference to FIG. 3.

FIG. 3 is a schematic diagram of a first track segment image frame provided by an embodiment of the present disclosure. Referring to FIG. 3, an electronic device is included. A display page of the electronic device includes a video editing page. The video editing page comprises a display area, and the display area may display an image frame corresponding to a video material. Image 1, image 2 and image 3 are track segment image frames in video track segments, and the video editing track corresponding to the video track segments is in the display area; therefore, image 1, image 2 and image 3 are the first track segment image frame, and the cache priorities of image 1, image 2 and image 3 are the first priority.

Case 2: the cache priority of a second track segment image frame is a second priority.

Optionally, in response to the video editing track being located in the display area, the cache priorities of second track segment image frames not within the track timeline range of the display area in a video track segment of the video editing track are second priority. For example, if the video editing track is located in the display area, this indicates that the video track segment of the video editing track may be displayed in the display area of the video editing interface; however, since the size of the display area is limited, the video track segment of the video editing track comprises track segment image frames which are temporarily not displayed in the display area (e.g., an image frame which is slid out of the display area of the screen based on an operation such as leftward sliding or rightward sliding). This type of image frame may be the second track segment image frame, and the cache priorities of such type of track segment image frames may be the second priority.

Next, a second track segment image frame will be described with reference to FIG. 4.

Figure 4:
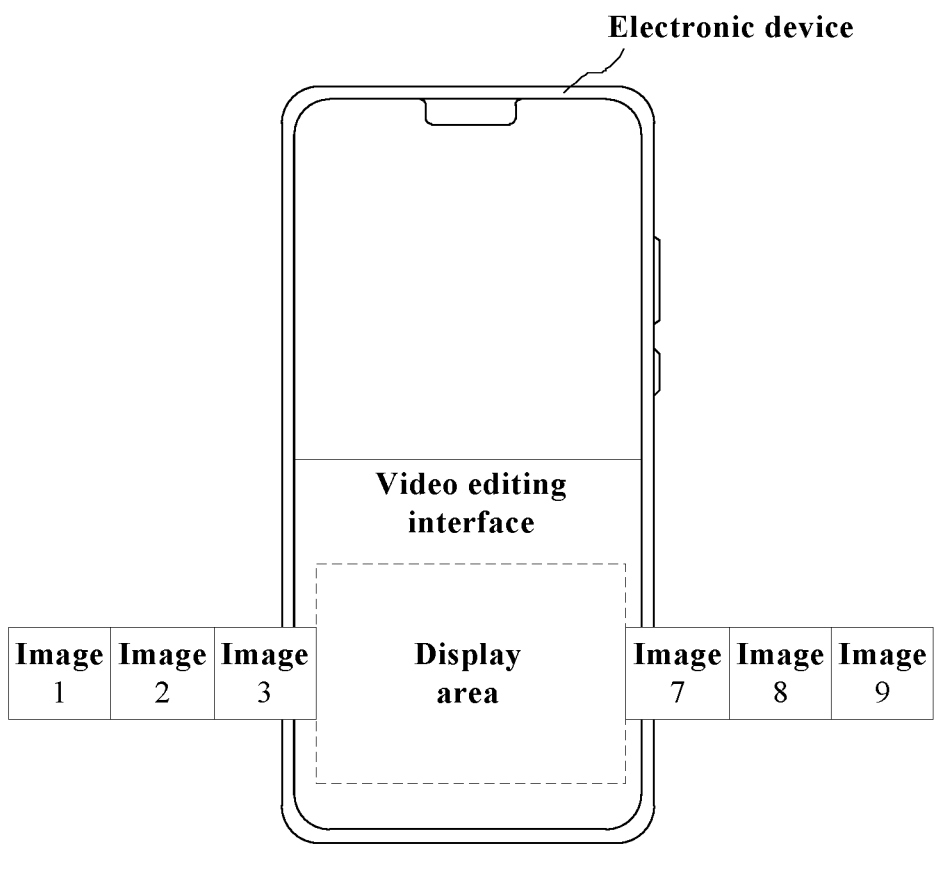
FIG. 4 is a schematic diagram of a second track segment image frame provided by an embodiment of the present disclosure.

FIG. 4 is a schematic diagram of a second track segment image frame provided by an embodiment of the present disclosure. Referring to FIG. 4, an electronic device is included. A display page of the electronic device includes a video editing page. The video editing page comprises a display area, and the display area may display image frames corresponding to a video material. Image 1, image 2, image 3, image 7, image 8 and image 9 are track segment image frames in video track segments, and a video editing track corresponding to the video track segments is in the display area; therefore, although image 1, image 2, image 3, image 7, image 8 and image 9 are not temporarily displayed in the display area, if a user slides a screen to the right, image 1, image 2 and image 3 may be displayed in the display area; if the user slides the screen to the left, image 7, image 8 and image 9 may be displayed in the display area; therefore, image 1, image 2, image 3, image 7, image 8 and image 9 may be the second track segment image frame, and the cache priorities are the second priority.

Case 3: the cache priority of a third track segment image frame is a third priority.

Optionally, in response to the video editing track being not in the display area, the cache priorities of third track segment image frames within the track timeline range of the display area in a video track segment of the video editing track are the third priority. For example, if the video editing track is not in the display area, this indicates that no track segment image frame in the video track segment is displayed in the display area regardless of a leftward sliding operation or a rightward sliding operation; however, if an upward sliding operation or a downward sliding operation is performed, the video editing track corresponding to the video track segment may be located in the display area, and therefore, the track segment image frames within the track timeline range of the display area in the video track segments may be displayed in the display area, and therefore, the type of the image frames is the third track segment image frame, and the cache priority of the type of image frames is the third priority.

Next, a third track segment image frame will be described with reference to FIG. 5.

Figure 5:
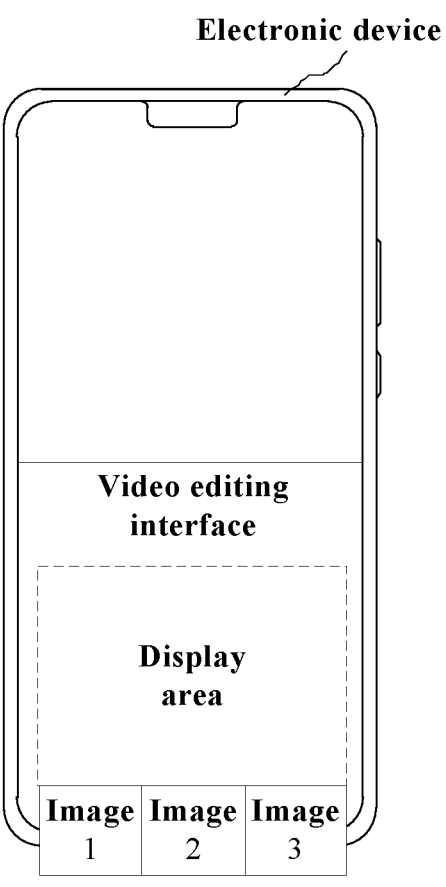
FIG. 5 is a schematic diagram of a third track segment image frame provided by an embodiment of the present disclosure.

FIG. 5 is a schematic diagram of a third track segment image frame provided by an embodiment of the present disclosure. Referring to FIG. 5, an electronic device is included. A display page of the electronic device includes a video editing page. The video editing page comprises a display area, and the display area may display an image frame corresponding to a video material. Image 1, image 2 and image 3 are track segment image frames in video track segments, and a video editing track corresponding to the video track segments is not in a display area; therefore, image 1, image 2 and image 3 are not displayed in the display area; however, if a user slides the screen upwards, a video editing track corresponding to the video track segments may be in the display area, and the display area may display image 1, image 2 and image 3; therefore, image 1, image 2 and image 3 may be the third track segment image frame, and the cache priorities are the third priority.

Case 4: the cache priority of a fourth track segment image frame is a fourth priority.

Optionally, in response to the video editing track being not in the display area, the cache priorities of fourth track segment image frames in a video track segment of the video editing track not within the track timeline range of the display area are the fourth priority. For example, if the video editing track is not in the display area, this indicates that the track segment image frames in the video track segment are not displayed in the display area regardless of a leftward sliding operation or a rightward sliding operation; however, if an upward sliding operation or a downward sliding operation is performed, the video editing track of the video track segment may be in the display area; however, since the size of the display area is limited, even if the video track segments may be displayed in the display area, part of the track segment image frames cannot be displayed in the display area. Such type of track segment image frames may be the fourth track segment image frame, and the cache priority of such type of track segment image frames may be the fourth priority.

Next, a fourth track segment image frame will be described with reference to FIG. 6.

Figure 6:
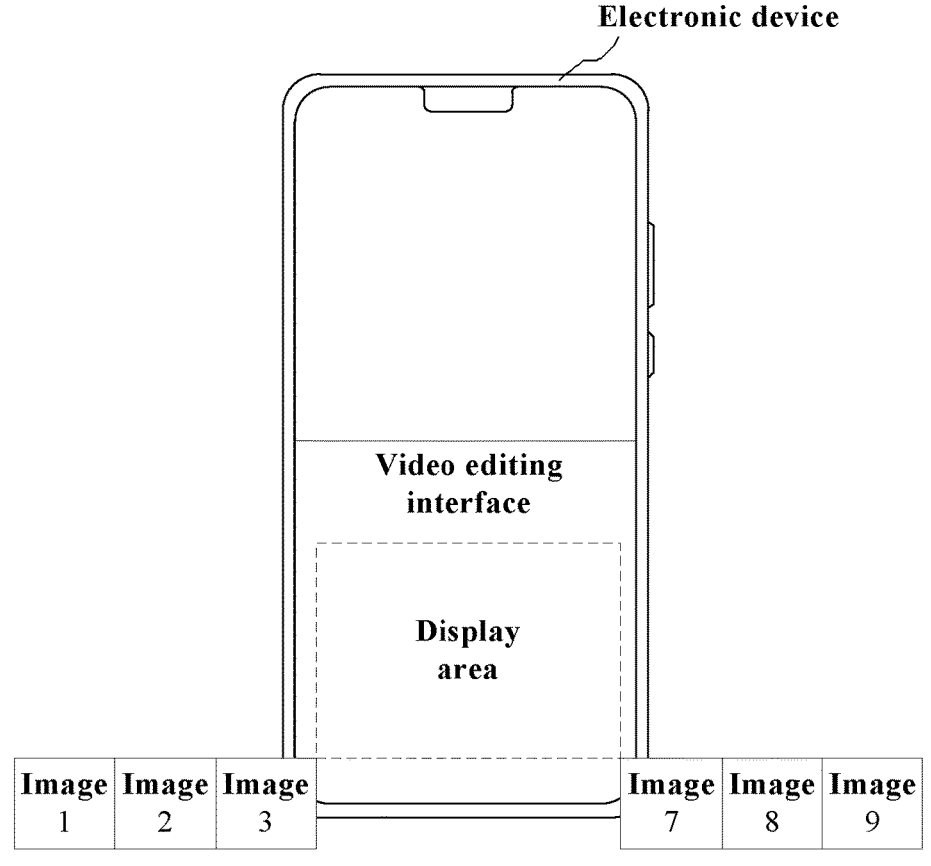
FIG. 6 is a schematic diagram of a fourth track segment image frame provided by an embodiment of the present disclosure.

FIG. 6 is a schematic diagram of a fourth track segment image frame provided by an embodiment of the present disclosure. Referring to FIG. 6, an electronic device is included. A display page of the electronic device includes a video editing page. The video editing page comprises a display area, and the display area may display an image frame corresponding to a video material. Image 1, image 2, image 3, image 7, image 8 and image 9 are a track segment image frame in a video track segment, and a video editing track corresponding to the video track segment is not in the display area; therefore, image 1, image 2, image 3, image 7, image 8 and image 9 are not displayed in the display area; even if a user slides the screen upwards so that the video editing track corresponding to the video track segment is in the display area, the display area does not display image 1, image 2, image 3, image 7, image 8 and image 9; therefore, image 1, image 2, image 3, image 7, image 8 and image 9 may be the fourth track segment image frame, and the cache priorities are the fourth priority.

Optionally, the first priority is greater than the second priority, the second priority is greater than the third priority, and the third priority is greater than the fourth priority. For example, since the first track segment image frame has the highest priority, the electronic device may preferentially cache the first track segment image frame; since the priority of the second track segment image frame is lower than that of the first track segment image frame, the electronic device may cache the second track segment image frame after having already cached all the first track segment image frames; since the priority of the third track segment image frame is lower than that of the second track segment image frame, the electronic device may cache the third track segment image frame after having already cached all the first track segment image frames and all the second track segment image frames; since the priority of the fourth track segment image frame is lower than that of the third track segment image frame, the electronic device may cache the fourth track segment image frame after having already cached all the first track segment image frames, all the second track segment image frames and all the third track segment image frames.

S203: determining a target track segment image frame from the track segment image frames of the plurality of video track segments based on the cache priorities and a cache frame configuration parameter, and caching the target track segment image frame.

Optionally, the cache frame configuration parameter may indicate a capability of caching image frames of the electronic device. For example, the higher the cache frame configuration parameter of the electronic device, the stronger the processing capability of the electronic device, the greater the number of track segment image frames that may be cached in the memory of the electronic device; the lower the cache frame configuration parameter of the electronic device, the weaker the processing capability of the electronic device, and the smaller the number of track segment image frames that may be cached in the memory of the electronic device.

Optionally, the cache frame configuration parameter of the electronic device may be a preset parameter. For example, electronic devices of different models have different cache frame configuration parameters, and a cache frame configuration parameter may be preset for each electronic device; therefore, the electronic device may obtain the preset cache frame configuration parameter.

Optionally, the electronic device may determine the cache frame configuration parameter based on a hardware configuration. For example, the electronic device may determine the cache frame configuration parameter based on the configuration of the memory. For example, if the configuration of the memory is low, the cache frame configuration parameter of the electronic device is low; if the configuration of the memory is high, the cache frame configuration parameter of the electronic device is high. For example, if the RAM of the electronic device is a 2G running memory, the cache frame configuration parameter of the electronic device may be 3; if the RAM of the electronic device is a 4G running memory, the cache frame configuration parameter of the electronic device may be 5; and if the RAM of the electronic device is an 8G running memory, the cache frame configuration parameter of the electronic device may be 7.

Optionally, the electronic device may also adjust the cache frame configuration parameter according to an occupation rate of the memory by the cached video frames. For example, if the RAM of the electronic device is an 8G running memory, the cache frame configuration parameter of the electronic device may be 7; however, if the OOM or the occupation rate of the memory of the electronic device is high (for example, the memory is more allocated for the decoding of video frames), the cache frame configuration parameter of the electronic device may be set to 5.

Optionally, the electronic device may also determine the cache frame configuration parameters based on an editing operation. For example, the electronic device may determine the cache frame configuration parameter based on a sliding speed corresponding to the editing operation. For example, if the editing operation of the user indicates that a speed at which the user slides the screen is greater than a first threshold, the electronic device determines that the cache frame configuration parameter is 7; if the editing operation of the user indicates that the speed at which the user slides the screen is less than or equal to the first threshold, the electronic device determines that the cache frame configuration parameter is 5.

It needs to be appreciated that the electronic device may also determine the cache frame configuration parameter by other methods. For example, the electronic device presets a cache frame configuration parameter, and then adjusts the cache frame configuration parameter in real time according to the sliding speed corresponding to the editing operation, which is not limited by the embodiments of the present disclosure.

Optionally, the electronic device may determine target track segment image frames from the track segment image frames of the plurality of video track segments according to the following feasible implementations: determining a first number of track segment image frames cacheable by the electronic device, based on the cache frame configuration parameter, and determining the target track segment image frames in the track segment image frames of the plurality of video track segments based on the cache priorities and the first number.

Optionally, the determining a first number of track segment image frames cacheable by the electronic device, based on the cache frame configuration parameter is specifically as follows: obtaining a second number of track segment image frames of each video track segment within the track timeline range of the display area. For example, the second number is three if a line in the display area (one line displaying one video track segment) may display three track segment image frames, and the second number is five if a line in the display area may display five track segment image frames. For example, in the embodiment shown in FIG. 3, a line in the display area comprises image 1, image 2 and image 3, so the second number of track segment image frames within the track timeline range of the display area is 3.

The first number is determined according to the second number and the cache frame configuration parameter. For example, the first number is determined according to the second number, the cache frame configuration parameter, and the number of video editing tracks. For example, if the second number of track segment image frames displayed per line of the display area is 3, the cache frame configuration parameter is 7; if the number of video editing tracks is 5, the first number of track segment image frames cacheable by the electronic device is 105 (3*7*5).

Optionally, the determining the target track segment image frame in the track segment image frames of the plurality of video track segments based on the cache priorities and the first number has the following two cases:

Case 1: the first number is greater than or equal to a sum of the number of first track segment image frames, second track segment image frames, third track segment image frames and fourth track segment image frames.

If the first number is greater than or equal to the sum of the number of the first track segment image frames, the second track segment image frames, the third track segment image frames and the fourth track segment image frames, the first track segment image frames, the second track segment image frames, the third track segment image frames and the fourth track segment image frames are determined as the target track segment image frames. For example, if the first number is 200 and the sum of the number of the first track segment image frames, the second track segment image frames, the third track segment image frames and the fourth track segment image frames is 150. This indicates that the electronic device may completely cache all the track segment image frames and the electronic device may determine all the track segment image frames as the target track segment image frames.

Case 2: the first number is smaller than the sum of the number of the first track segment image frames, the second track segment image frames, the third track segment image frames and the fourth track segment image frames.

If the first number is less than the sum of the number of the first track segment image frames, the second track segment image frames, the third track segment image frames and the fourth track segment image frames, the target track segment image frame is determined from the first track segment image frames, the second track segment image frames, the third track segment image frames and the fourth track segment image frames in sequence based on the order of the cache priorities. For example, if the first number is 120 and the sum of the number of the first track segment image frames, the second track segment image frames, the third track segment image frames and the fourth track segment image frames is 200, this indicates that the electronic device has 100 track segment image frames which cannot be cached. Therefore, the electronic device may determine the target track segment image frames according to the order of the caching priority; if the number of the first track segment image frames is 30, the number of the second track segment image frames is 70, the number of the third track segment image frames is 30 and the number of the fourth track segment image frames is 70, the electronic device may determine 30 first track segment image frames, 70 second track segment image frames and 20 third track segment image frames as target track segment image frames.

Optionally, the electronic device may cache the target track segment image frames in the memory after having determining the target track segment image frames. For example, the electronic device may cache the target track image frame into memory so that the electronic device may quickly obtain the target track segment image frames from the memory.

It needs to be appreciated that since a speed at which the electronic device obtains the track segment image frames in the memory cache is greater than a speed at which the electronic device obtains the track segment image frames in the hard disk cache, when the electronic device loads the track segment image frames, the electronic device may firstly obtain the track segment image frame to be loaded in the memory, and if the track segment image frame is not included in the memory, the electronic device may obtain the track segment image frame to be loaded from the hard disk, and if the track segment image frame is not included in the hard disk either, the electronic device may then obtain the track segment image frame from a file storing the video material (video material cache) and cache the track segment image frame to the memory and the hard disk.

It needs to be appreciated that a CPU occupation rate of the operation of the electronic device obtaining the track segment image frames from the memory is high, so the electronic device may preset a parallel amount of obtaining the track segment image frames so as to avoid the sticking of the electronic device when obtaining the track segment image frames. For example, the electronic device limits the number of decoding disk cache threads to be 5 and the number of frame threads to be 1, so that the electronic device may decode 5 track segment image frames and obtain one frame track segment image frame at a time. As such, when obtaining multiple frame track segment image frames, the sticking phenomenon will not occur with the electronic device, and the running fluency of the electronic device may be improved.

Embodiments of the present disclosure provide a video processing method. An electronic device may determine a plurality of video track segments located on a plurality of video editing tracks on a video editing interface, and determine first track segment video frames, second track segment video frames, third track segment video frames and fourth track segment video frames in the plurality of video track segments according to whether the plurality of video editing tracks are located in a display area section of the video editing interface, and according to track segment image frames of the plurality of video track segments within a track timeline range of the display area, and determining target track segment image frames from the track segment image frames of the plurality of video track segments according to cache priorities and a cache frame configuration parameter, and caching the target track segment image frames. In this way, since there are different priorities among the track segment image frames in the plurality of video track segments, the electronic device has a sequential order upon caching the track segment image frames, thereby improving the caching flexibility; furthermore, the sticking phenomenon caused by large occupation of the memory of the electronic device may also be avoided in conjunction with the cache frame configuration parameter, thereby improving the efficiency of the video clipping.

On the basis of any of the above-mentioned embodiments, the embodiments of the present disclosure further comprise a method of managing target track segment image frames cached in a memory. The method of managing target track segment image frames cached in a memory will be described in detail below with reference to FIG. 7.

Figure 7:
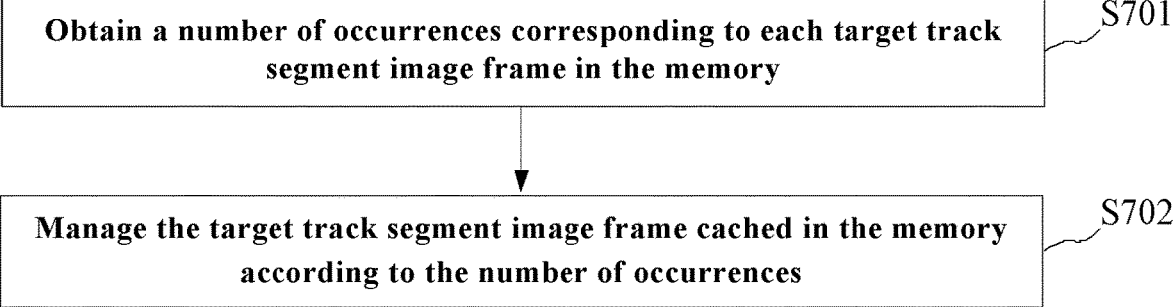
FIG. 7 is a schematic diagram of a method of managing target track segment image frames provided by an embodiment of the present disclosure.

FIG. 7 is a schematic diagram of a method of managing target track segment image frames provided by an embodiment of the present disclosure. Referring to FIG. 7, the flow of the method comprises:

S701: obtaining a number of occurrences corresponding to each target track segment image frame in the memory.

Optionally, the number of occurrences is a sum of the number of occurrences of the target track segment image frames in the first track segment image frames, the second track segment image frames, the third track segment image frames, and the fourth track segment image frames. For example, during practical application, a plurality of video materials may comprise the same track segment image frames. Therefore, for any one track segment image frame, if the track segment image frame occurs in any of the first track segment image frames, the second track segment image frames, the third track segment image frames or the fourth track segment image frames, the electronic device may cache the track segment image frame in the memory, and obtain the number of occurrences corresponding to the track segment image frame. For example, for any one track segment image frame, the track segment image frame may be different track segment image frames of the same video material, or the video frame may be track segment image frames in different video materials. Therefore, the track segment image frames are repeatedly used when the plurality of video materials are edited.

Optionally, as for any one target track segment image frame, the electronic device may obtain the number of occurrences corresponding to the target track segment image frame in the memory in the following feasible implementation manner: when the target track segment image frame is within a range of the first track segment image frames, the second track segment image frames, the third track segment image frames or the fourth track segment image frames, the number of occurrences corresponding to the target track segment image frame is increased by N, N being a number greater than 0. For example, if the target track segment image frame A occurs once in the first track segment image frames, once in the second track segment image frames, once in the third track segment image frames, and once in the fourth track segment image frames, the number of occurrences corresponding to the target track segment image frame A in the memory is four times; if the target track segment image frame B occurs three times in the first track segment image frames, twice in the second track segment image frames, and does not occur in the third track segment image frames and the fourth track segment image frames, the number of occurrences corresponding to the target track segment image frame B is five times.

When the target track segment image frame is not within the range of the first track segment image frames, the second track segment image frames, the third track segment image frames or the fourth track segment image frames, the number of occurrences corresponding to the target track segment image frame is decreased by N. For example, if the target track segment image frame occurs once in the first track segment image frames, once in the second track segment image frames, and once in the third track segment image frames, the number of occurrences corresponding to the target track segment image frame is three; if a user slides the video material so that the target track segment image frame is not within the range of the first track segment image frames, the number of occurrences corresponding to the target track segment image frame is two (three minus one);

if the user continues to slide the video material so that the target track segment image frame is not within the range of the second track segment image frames and the third track segment image frames, the number of occurrences corresponding to the target track segment image frame is 0.

S702: managing the target track segment image frame cached in the memory according to the number of occurrences.

Optionally, the electronic device may delete the target track segment image frame from the memory when the number of occurrences corresponding to the target track segment image frame in the memory is 0. For example, if the number of occurrences corresponding to the target track segment image frame is 0, this means that the target track segment image frame does not need to be displayed in the display area of the video editing interface within a period of time; therefore, the electronic device may delete the target track segment image frame from the memory, thereby saving the resources of the memory of the electronic device.

The embodiment of the present disclosure provides a method for managing target track segment image frames, comprising obtaining a number of occurrences corresponding to each target track segment image frame in the memory; managing the target track segment image frame cached in the memory according to the number of occurrences. As such, the electronic device may delete the target track segment image frames which do not need to be displayed in the display area within a period of time in the memory according to the editing operation of the user, thereby saving the resources in the memory of the electronic device, preventing the editing process from being stuck due to the large occupation of the memory, and improving the efficiency of video editing.

Figure 8:
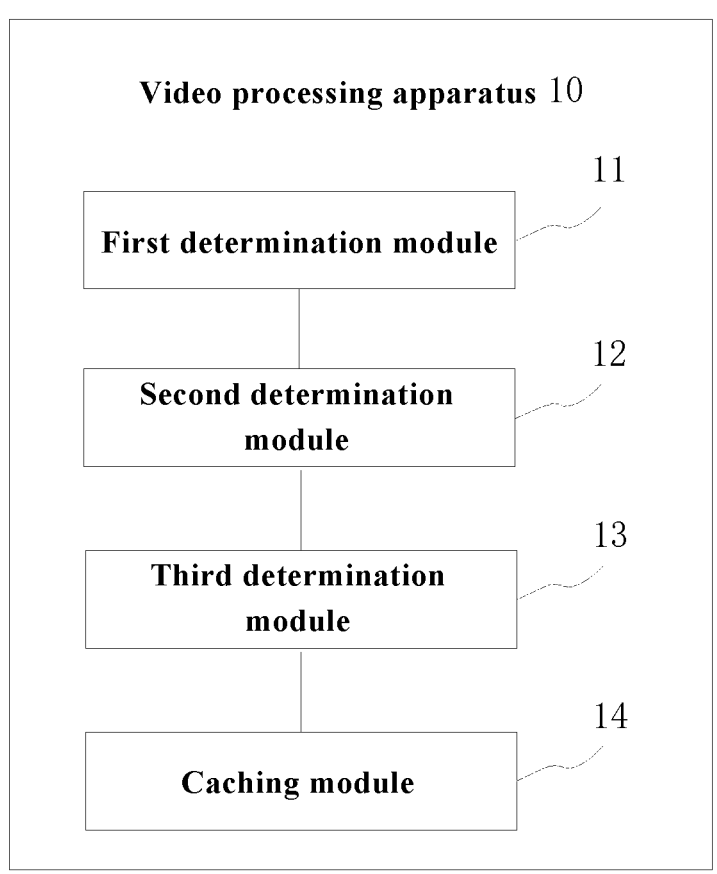
FIG. 8 is a block diagram of a video processing apparatus according to an embodiment of the present disclosure.

FIG. 8 is a block diagram of a video processing apparatus according to an embodiment of the present disclosure. With reference to FIG. 8, the video processing apparatus 8 comprises a first determination module 11, a second determination module 12, a third determination module 13 and a caching module 14, wherein:

the first determination module 11 is used to determine a plurality of video track segments on a plurality of video editing tracks on a video editing interface;

the second determination module 12 is used to determine cache priorities of the track segment image frames of the plurality of video track segments, according to whether the plurality of video editing tracks are located in the display area of the video editing interface, and track segment image frames of the plurality of video track segments within a track timeline range of the display area; wherein the track segment image frames of the video track segments are displayed at track timeline positions in the video track segments corresponding to the track segment image frames;

the third determination module 13 is used to determine a target track segment image frame from the track segment image frames of the plurality of video track segments according to the cache priorities and a cache frame configuration parameter;

the caching module 14 is used to cache the target track segment image frame.

According to one or more embodiments of the present disclosure, the second determination module 12 is specifically used in a way that:

the video editing track is located in the display area, and the cache priority of the first track segment image frame within the track timeline range of the display area in the video track segment of the video editing track is a first priority;

the video editing track is located in the display area, and the cache priorities of second track segment image frames not within the track timeline range of the display area in the video track segment of the video editing track is a second priority;

the video editing track is not in the display area, and the cache priority of third track segment image frames within the track timeline range of the display area in the video track segment of the video editing track is a third priority;

the video editing track is not in the display area, and the cache priorities of fourth track segment image frames not within the track timeline range of the display area in the video track segment of the video editing track is a fourth priority.

According to one or more embodiments of the present disclosure, the first priority is greater than the second priority, the second priority is greater than the third priority, and the third priority is greater than the fourth priority.

According to one or more embodiments of the present disclosure, the third determination module 13 is specifically used to:

determine a first number of track segment image frames cacheable by the electronic device, based on the cache frame configuration parameter;

determine the target track segment image frame from the track segment image frames of the plurality of video track segments based on the cache priorities and the first number.

According to one or more embodiments of the present disclosure, the third determination module 13 is specifically used to:

if the first number is greater than or equal to a sum of the number of the first track segment image frames, the second track segment image frames, the third track segment image frames and the fourth track segment image frames, determine the first track segment image frames, the second track segment image frames, the third track segment image frames and the fourth track segment image frames as the target track segment image frames;

if the first number is less than the sum of the number of the first track segment image frames, the second track segment image frames, the third track segment image frames and the fourth track segment image frames, determine the target track segment image frame from the first track segment image frames, the second track segment image frames, the third track segment image frames and the fourth track segment image frames in sequence based on the order of the cache priorities.

According to one or more embodiments of the present disclosure, the third determination module 13 is specifically used to:

obtain a second number of track segment image frames of each video track segment within the track timeline range of the display area;

determine the first number according to the second number and the cache frame configuration parameter.

The video processing apparatus provided by the embodiments of the present disclosure may be used to execute the technical solutions of the above-mentioned method embodiments, and the implementation principles and technical effects thereof are similar to those of the video processing method, and will not be described in detail in the embodiments of the present disclosure.

Figure 9:
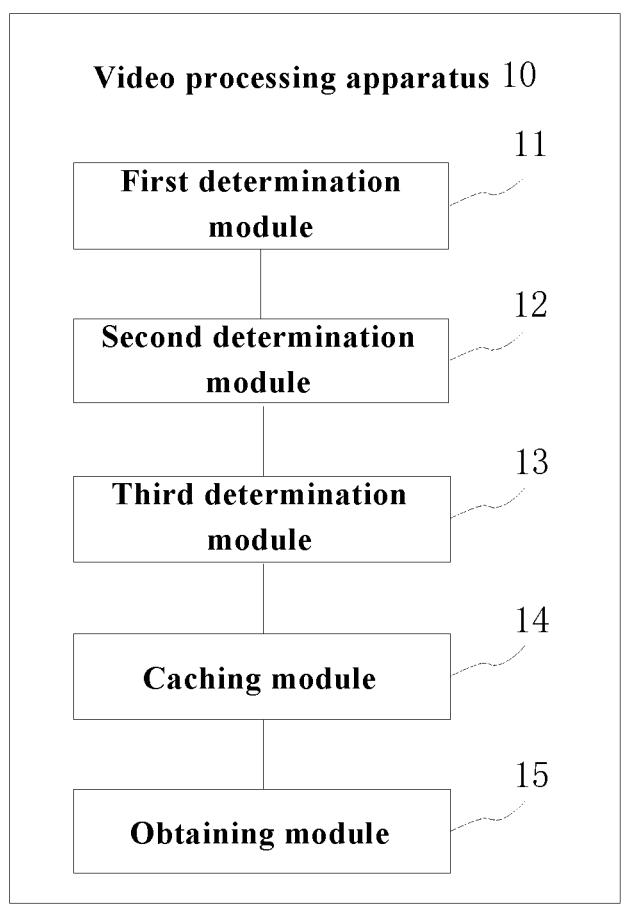
FIG. 9 is a block diagram of another video processing apparatus according to an embodiment of the present disclosure.

FIG. 9 is a block diagram of another video processing apparatus according to an embodiment of the present disclosure. On the basis of the embodiment shown in FIG. 8, referring to FIG. 9, the video processing apparatus 10 further comprises an obtaining module 15 used to:

obtain a number of occurrences corresponding to each target track segment image frame in the memory, the number of occurrences being a sum of the number of occurrences of the target track segment image frame in the first track segment image frames, the second track segment image frames, the third track segment image frames, and the fourth track segment image frames;

manage the target track segment image frame cached in the memory according to the number of occurrences.

According to one or more embodiments of the present disclosure, the obtaining module 15 is specifically used to:

upon the target track segment image frame is within a range of the first track segment image frames, the second track segment image frames, the third track segment image frames or the fourth track segment image frames, increase the number of occurrences corresponding to the target track segment image frame by N, N being a number greater than 0;

upon the target track segment image frame is not within the range of the first track segment image frames, the second track segment image frames, the third track segment image frames or the fourth track segment image frames, decrease the number of occurrences corresponding to the target track segment image frame by N.

The video processing apparatus provided by the embodiments of the present disclosure may be used to execute the technical solutions of the above-mentioned method embodiments, and the implementation principles and technical effects thereof are similar to those of the video processing method, and will not be described in detail in the embodiments of the present disclosure.

Figure 10:
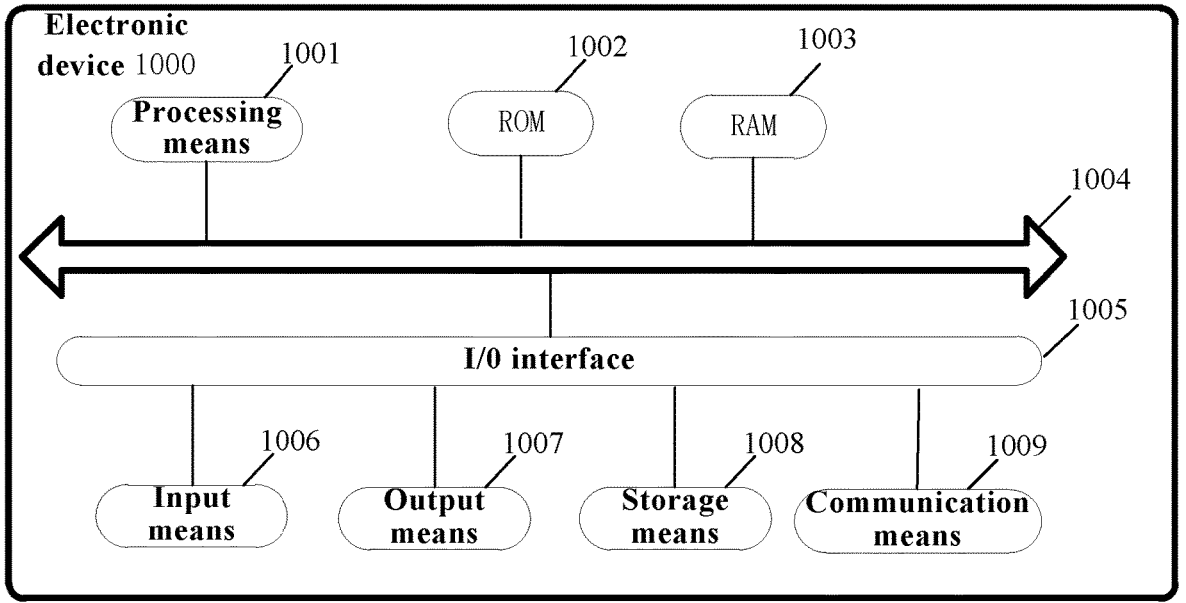
FIG. 10 is a block diagram of an electronic device according to an embodiment of the present disclosure.

FIG. 10 is a block diagram of an electronic device according to an embodiment of the present disclosure. Reference is now made to FIG. 10, which illustrates a structural schematic diagram of an electronic device 1000 suitable for implementing embodiments of the present disclosure. The electronic device 1000 may be a terminal device or a server. The terminal device may comprise, but are not limited to, a mobile terminal such as a mobile phone, a notebook computer, a digital broadcast receiver, a PDA (Personal Digital Assistant), a PAD (Portable Android Device), a PMP (Portable Multimedia Player), an in-vehicle terminal (e.g., an in-vehicle navigation terminal), etc. and a fixed terminal such as a digital TV, a desktop computer, etc. The electronic device shown in FIG. 10 is merely an example and should not impose any limitations on the functionality and scope of use of embodiments of the present disclosure.

As shown in FIG. 10, the electronic device 1000 may comprise a processing device (e.g., a central processing unit, a graph processor, etc.) 1001 that may perform various suitable actions and processes in accordance with a program stored in a read only memory (ROM) 1002 or a program loaded from a storage means 1008 into a random access memory (RAM) 1003. In the RAM 1003, various programs and data needed by the operation of the electronic device 1000 are also stored. The processing device 1001, the ROM 1002, and the RAM 1003 are connected to each other via a bus 1004. An input/output (I/O) interface 1005 is also coupled to bus 1004.

In general, the following devices may be connected to the I/O interface 1005: an input means 1006 including, for example, a touch screen, a touch pad, a keyboard, a mouse, a camera, a microphone, an accelerometer, a gyroscope, etc.; an output means 1008 including, for example, a liquid crystal display (LCD), a speaker, a vibrator, etc.; a storage means 1007 including, for example, a magnetic tape, a hard disk, etc.; and a Communication means 1009. The Communication means 1009 may allow the electronic device 1000 to communicate in a wireless or wired manner with other devices to exchange data. While FIG. 10 illustrates the electronic device 1000 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure comprise a computer program product comprising a computer program carried on a non-transitory computer-readable medium, the computer program comprising program code for performing the method illustrated by the flow charts. In such embodiments, the computer program may be downloaded and installed from a network via the communication means 1009, or installed from the storage means 1008, or installed from the ROM 1002. When the computer program is executed by the processing device 1001, the above-described functions defined in the method of the embodiment of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage means, a magnetic storage means, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

The computer readable medium may be contained in the above-described electronic device; it may also be present separately and not installed into the electronic device.

The computer-readable medium carries one or more programs that, when executed by the electronic device, cause the electronic device to perform the above method of the present disclosure.

The computer program code for carrying out operations of the present disclosure may be written in one or more programming languages or combinations thereof. The programming languages include, but not limited to, object-oriented programming languages, such as Java, Smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units described in connection with the embodiments disclosed herein may be implemented in a software or hardware manner. The names of the units do not constitute limitations of the units themselves in a certain case. For example, the first obtaining unit may also be described as a unit obtaining at least two Internet protocol address.

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems on Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage means, a magnetic storage means, or any suitable combination thereof.

According to one or more embodiments of the present disclosure, there is provided a video processing method, comprising:

determining a plurality of video track segments on a plurality of video editing tracks on a video editing interface;

determining cache priorities of the track segment image frames of the plurality of video track segments, according to whether the plurality of video editing tracks are located in the display area of the video editing interface, and track segment image frames of the plurality of video track segments within a track timeline range of the display area; wherein the track segment image frames of the video track segments are displayed at track timeline positions in the video track segments corresponding to the track segment image frames;

determining a target track segment image frame from the track segment image frames of the plurality of video track segments based on the cache priorities and a cache frame configuration parameter, and caching the target track segment image frame.

According to one or more embodiments of the present disclosure, the determining cache priorities of the track segment image frames of the plurality of video track segments comprises:

the video editing track is located in the display area, and the cache priority of the first track segment image frame within the track timeline range of the display area in the video track segment of the video editing track is a first priority;

the video editing track is located in the display area, and the cache priorities of second track segment image frames not within the track timeline range of the display area in the video track segment of the video editing track is a second priority;

the video editing track is not in the display area, and the cache priority of third track segment image frames within the track timeline range of the display area in the video track segment of the video editing track is a third priority;

the video editing track is not in the display area, and the cache priorities of fourth track segment image frames not within the track timeline range of the display area in the video track segment of the video editing track is a fourth priority.

According to one or more embodiments of the present disclosure, the first priority is greater than the second priority, the second priority is greater than the third priority, and the third priority is greater than the fourth priority.

According to one or more embodiments of the present disclosure, the determining a target track segment image frame from the track segment image frames of the plurality of video track segments based on the cache priorities and a cache frame configuration parameter comprises:

determining a first number of track segment image frames cacheable by the electronic device, based on the cache frame configuration parameter;

determining the target track segment image frame from the track segment image frames of the plurality of video track segments based on the cache priorities and the first number.

According to one or more embodiments of the present disclosure, the determining the target track segment image frame from the track segment image frames of the plurality of video track segments based on the cache priorities and the first number comprises:

if the first number is greater than or equal to a sum of the number of the first track segment image frames, the second track segment image frames, the third track segment image frames and the fourth track segment image frames, determining the first track segment image frames, the second track segment image frames, the third track segment image frames and the fourth track segment image frames as the target track segment image frames;

if the first number is less than the sum of the number of the first track segment image frames, the second track segment image frames, the third track segment image frames and the fourth track segment image frames, determining the target track segment image frame from the first track segment image frames, the second track segment image frames, the third track segment image frames and the fourth track segment image frames in sequence based on the order of the cache priorities.

According to one or more embodiments of the present disclosure, the determining a first number of track segment image frames cacheable by the electronic device, based on the cache frame configuration parameter comprises:

obtaining a second number of track segment image frames of each video track segment within the track timeline range of the display area;

determining the first number according to the second number and the cache frame configuration parameter.

According to one or more embodiments of the present disclosure, after caching the target track segment image frame, the method further comprises:

obtaining a number of occurrences corresponding to each target track segment image frame in the memory, the number of occurrences being a sum of the number of occurrences of the target track segment image frame in the first track segment image frames, the second track segment image frames, the third track segment image frames, and the fourth track segment image frames;

managing the target track segment image frame cached in the memory according to the number of occurrences.

According to one or more embodiments of the present disclosure, as for any one target track segment image frame in the memory, obtaining a number of occurrences corresponding to the target track segment image frame in the memory comprises:

upon the target track segment image frame is within a range of the first track segment image frames, the second track segment image frames, the third track segment image frames or the fourth track segment image frames, increasing the number of occurrences corresponding to the target track segment image frame by N, N being a number greater than 0;

upon the target track segment image frame is not within the range of the first track segment image frames, the second track segment image frames, the third track segment image frames or the fourth track segment image frames, decreasing the number of occurrences corresponding to the target track segment image frame by N.

In a second aspect, embodiments of the present disclosure provide a video processing apparatus comprising a first determination module, a second determination module, a third determination module and a caching module, wherein:

the first determination module is used to determine a plurality of video track segments on a plurality of video editing tracks on a video editing interface;

the second determination module is used to determine cache priorities of the track segment image frames of the plurality of video track segments, according to whether the plurality of video editing tracks are located in the display area of the video editing interface, and track segment image frames of the plurality of video track segments within a track timeline range of the display area; wherein the track segment image frames of the video track segments are displayed at track timeline positions in the video track segments corresponding to the track segment image frames;

the third determination module is used to determine a target track segment image frame from the track segment image frames of the plurality of video track segments according to the cache priorities and a cache frame configuration parameter;

the caching module is used to cache the target track segment image frame.

According to one or more embodiments of the present disclosure, the second determination module is specifically used in a way that:

the video editing track is located in the display area, and the cache priority of the first track segment image frame within the track timeline range of the display area in the video track segment of the video editing track is a first priority;

the video editing track is located in the display area, and the cache priorities of second track segment image frames not within the track timeline range of the display area in the video track segment of the video editing track is a second priority;

the video editing track is not in the display area, and the cache priority of third track segment image frames within the track timeline range of the display area in the video track segment of the video editing track is a third priority;

the video editing track is not in the display area, and the cache priorities of fourth track segment image frames not within the track timeline range of the display area in the video track segment of the video editing track is a fourth priority.

According to one or more embodiments of the present disclosure, the first priority is greater than the second priority, the second priority is greater than the third priority, and the third priority is greater than the fourth priority.

According to one or more embodiments of the present disclosure, the third determination module is specifically used to:

determine a first number of track segment image frames cacheable by the electronic device, based on the cache frame configuration parameter;

determine the target track segment image frame from the track segment image frames of the plurality of video track segments based on the cache priority and the first number.

According to one or more embodiments of the present disclosure, the third determination module is specifically used to:

if the first number is greater than or equal to a sum of the number of the first track segment image frames, the second track segment image frames, the third track segment image frames and the fourth track segment image frames, determine the first track segment image frames, the second track segment image frames, the third track segment image frames and the fourth track segment image frames as the target track segment image frames;

if the first number is less than the sum of the number of the first track segment image frames, the second track segment image frames, the third track segment image frames and the fourth track segment image frames, determine the target track segment image frame from the first track segment image frames, the second track segment image frames, the third track segment image frames and the fourth track segment image frames in sequence based on the order of the cache priorities.

According to one or more embodiments of the present disclosure, the third determination module is specifically used to:

obtain a second number of track segment image frames of each video track segment within the track timeline range of the display area;

determine the first number according to the second number and the cache frame configuration parameter.

According to one or more embodiments of the present disclosure, the video processing apparatus further comprises an obtaining module used to:

obtain a number of occurrences corresponding to each target track segment image frame in the memory, the number of occurrences being a sum of the number of occurrences of the target track segment image frame in the first track segment image frames, the second track segment image frames, the third track segment image frames, and the fourth track segment image frames;

manage the target track segment image frame cached in the memory according to the number of occurrences.

According to one or more embodiments of the present disclosure, the obtaining module is specifically used to:

upon the target track segment image frame is within a range of the first track segment image frames, the second track segment image frames, the third track segment image frames or the fourth track segment image frames, increase the number of occurrences corresponding to the target track segment image frame by N, N being a number greater than 0;

upon the target track segment image frame is not within the range of the first track segment image frames, the second track segment image frames, the third track segment image frames or the fourth track segment image frames, decrease the number of occurrences corresponding to the target track segment image frame by N.

In a third aspect, embodiments of the present disclosure provide an electronic device, comprising: a processor and a memory;

the memory stores computer-executable instructions;

the processor executes computer-executable instructions stored in the memory to cause the at least one processor to perform the video processing method according to the above first aspect and various possibilities of the first aspect.

In a fourth aspect, embodiments of the present disclosure provide a computer-readable storage medium on which computer-executable instructions stored, the computer-executable instructions when executed by a processor, implement the video processing method according to the first aspect and various possibilities of the first aspect.

In a fifth aspect, embodiments of the present disclosure provide a computer program product comprising a computer program which, when executed by a processor, implements the video processing method according to the first aspect and various possibilities of the first aspect above.

It needs to be appreciated that the modifiers "a" or "an" and "a plurality of" in the present disclosure are intended to be illustrative and not restrictive, and those skilled in the art should understand that the modifiers should be understood as "one or more" unless the context clearly indicates otherwise.

The names of messages or information interacted between devices in embodiments of the present disclosure are for illustrative purposes only and are not intended to limit the scope of such messages or information.

It may be appreciated that prior to using the technical solutions disclosed in the various embodiments of the present disclosure, the user should be informed of the type, scope of use, use scenario, etc. of personal information involved in the present disclosure and authorization should be obtained from the user in an appropriate manner according to relevant laws and regulations.

For example, in response to receiving a user's active request, prompt information is sent to the user to explicitly prompt the user that the operation requested by the user to be performed will require obtaining and using the user's personal information. Accordingly, the user may autonomously select whether to provide personal information to software or hardware, such as an electronic device, an application, a server or a storage medium which executes the operations of the technical solution of the present disclosure, according to prompt information.

As an optional but non-limiting implementation, in response to receiving an active request from the user, the prompt message may be sent to the user, for example, in the form of a pop-up window in which the prompt message may be presented with words. In addition, the pop-up window may also carry a selection control for the user to select "agree" or "disagree" to provide personal information to the electronic device.

It is to be understood that the above-described process of informing the user and obtaining the use's authorization is merely illustrative and not intended to limit implementations of the present disclosure, and that other ways of satisfying relevant laws and regulations may also be applied to implementations of the present disclosure.

It is to be understood that the data involved in this technical solution (including but not limited to the data itself and the acquisition or use of the data) shall comply with the requirements of relevant laws and regulations and relevant provisions. The data may include information, parameters, messages, etc. such as stream-switching indication information.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also include other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above.

Rather, the specific features and acts described above are merely exemplary forms of implementing the claims.

We claim:

1. A method for improving efficiency of editing videos by a computing device, wherein the method comprises:
determining, by the computing device, a plurality of video track segments on a plurality of video editing tracks on a video editing interface;
determining, by the computing device, cache priorities of track segment image frames of the plurality of video track segments, according to whether the plurality of video editing tracks are located in a display area of the video editing interface and the track segment image frames of the plurality of video track segments within a track timeline range of the display area; wherein the track segment image frames of the video track segments are displayed at track timeline positions in the video track segments corresponding to the track segment image frames;
determining, by the computing device, a target track segment image frame from the track segment image frames of the plurality of video track segments based on the cache priorities and a cache frame configuration parameter, and caching the target track segment image frame.

2. The method according to claim 1, wherein the determining cache priorities of the track segment image frames of the plurality of video track segments comprises:
in response to the video editing track being located in the display area, a cache priority of first track segment image frames within the track timeline range of the display area in the video track segment of the video editing track is a first priority;
in response to the video editing track being located in the display area, a cache priority of second track segment image frames not within the track timeline range of the display area in the video track segment of the video editing track is a second priority;
in response to the video editing track being not in the display area, a cache priority of third track segment image frames within the track timeline range of the display area in the video track segment of the video editing track is a third priority;

in response to the video editing track being not in the display area, a cache priority of fourth track segment image frames not within the track timeline range of the display area in the video track segment of the video editing track is a fourth priority.

3. The method according to claim 2, wherein the first priority is greater than the second priority, the second priority is greater than the third priority, and the third priority is greater than the fourth priority.

4. The method according to claim 1, wherein the determining the target track segment image frame from the track segment image frames of the plurality of video track segments based on the cache priorities and the cache frame configuration parameter comprises:

determining a first number of track segment image frames cacheable by an electronic device, based on the cache frame configuration parameter;

determining the target track segment image frame from the track segment image frames of the plurality of video track segments based on the cache priorities and the first number.

5. The method according to claim 4, wherein the determining the target track segment image frame from the track segment image frames of the plurality of video track segments based on the cache priorities and the first number comprises:

in response to the first number being greater than or equal to a sum of the number of the first track segment image frames, the second track segment image frames, the third track segment image frames and the fourth track segment image frames, determining the first track segment image frames, the second track segment image frames, the third track segment image frames and the fourth track segment image frames as the target track segment image frames;

in response to the first number being less than the sum of the number of the first track segment image frames, the second track segment image frames, the third track segment image frames and the fourth track segment image frames, determining the target track segment image frame from the first track segment image frames, the second track segment image frames, the third track segment image frames and the fourth track segment image frames in sequence based on the order of the cache priorities.

6. The method according to claim 4, wherein the determining the first number of track segment image frames cacheable by the electronic device, based on the cache frame configuration parameter comprises:

obtaining a second number of track segment image frames of each video track segment within the track timeline range of the display area;

determining the first number according to the second number and the cache frame configuration parameter.

7. The method according to claim 1, wherein after caching the target track segment image frame, the method further comprises:

obtaining a number of occurrences corresponding to each target track segment image frame in a memory, the number of occurrences being a sum of the number of occurrences of the target track segment image frame in the first track segment image frames, the second track segment image frames, the third track segment image frames, and the fourth track segment image frames;

managing the target track segment image frame cached in the memory according to the number of occurrences.

8. The method according to claim 7, wherein as for any one target track segment image frame in the memory, obtaining the number of occurrences corresponding number to the target track segment image frame in the memory comprises:

in response to the target track segment image frame being within a range of the first track segment image frames, the second track segment image frames, the third track segment image frames or the fourth track segment image frames, increasing the number of occurrences corresponding to the target track segment image frame by N, N being a number greater than 0;

in response to the target track segment image frame being not within the range of the first track segment image frames, the second track segment image frames, the third track segment image frames or the fourth track segment image frames, decreasing the number of occurrences corresponding to the target track segment image frame by N.

9. An electronic device, wherein the electronic device comprises: a processor and a memory;

the memory stores computer-executable instructions;

the processor executes computer-executable instructions stored in the memory to cause the processor to:

determine a plurality of video track segments on a plurality of video editing tracks on a video editing interface;

determine cache priorities of track segment image frames of the plurality of video track segments, according to whether the plurality of video editing tracks are located in a display area of the video editing interface and the track segment image frames of the plurality of video track segments within a track timeline range of the display area; wherein the track segment image frames of the video track segments are displayed at track timeline positions in the video track segments corresponding to the track segment image frames;

determine a target track segment image frame from the track segment image frames of the plurality of video track segments based on the cache priorities and a cache frame configuration parameter, and caching the target track segment image frame.

10. The device according to claim 9, wherein:

in response to the video editing track being located in the display area, a cache priority of first track segment image frames within the track timeline range of the display area in the video track segment of the video editing track is a first priority;

in response to the video editing track being located in the display area, a cache priority of second track segment image frames not within the track timeline range of the display area in the video track segment of the video editing track is a second priority;

in response to the video editing track being not in the display area, a cache priority of third track segment image frames within the track timeline range of the display area in the video track segment of the video editing track is a third priority;

in response to the video editing track being not in the display area, a cache priority of fourth track segment image frames not within the track timeline range of the display area in the video track segment of the video editing track is a fourth priority.

11. The device according to claim 10, wherein the first priority is greater than the second priority, the second priority is greater than the third priority, and the third priority is greater than the fourth priority.

12. The device according to claim 9, wherein the instructions to determine the target track segment image frame from the track segment image frames of the plurality of video track segments based on the cache priorities and the cache frame configuration parameter comprise instructions causing the processor to:

determine a first number of track segment image frames cacheable by an electronic device, based on the cache frame configuration parameter;

determine the target track segment image frame from the track segment image frames of the plurality of video track segments based on the cache priorities and the first number.

13. The device according to claim 12, wherein the instructions to determine the target track segment image frame from the track segment image frames of the plurality of video track segments based on the cache priorities and the first number comprise instructions causing the processor to:

in response to the first number being greater than or equal to a sum of the number of the first track segment image frames, the second track segment image frames, the third track segment image frames and the fourth track segment image frames, determine the first track segment image frames, the second track segment image frames, the third track segment image frames and the fourth track segment image frames as the target track segment image frames;

in response to the first number being less than the sum of the number of the first track segment image frames, the second track segment image frames, the third track segment image frames and the fourth track segment image frames, determine the target track segment image frame from the first track segment image frames, the second track segment image frames, the third track segment image frames and the fourth track segment image frames in sequence based on the order of the cache priorities.

14. The device according to claim 12, wherein the instructions to determine the first number of track segment image frames cacheable by the electronic device, based on the cache frame configuration parameter comprise instructions causing the processor to:

obtain a second number of track segment image frames of each video track segment within the track timeline range of the display area;

determine the first number according to the second number and the cache frame configuration parameter.

15. The device according to claim 9, wherein the instructions further comprise instructions causing the processor to: after caching the target track segment image frame, obtain a number of occurrences corresponding to each target track segment image frame in a memory, the number of occurrences being a sum of the number of occurrences of the target track segment image frame in the first track segment image frames, the second track segment image frames, the third track segment image frames, and the fourth track segment image frames;

manage the target track segment image frame cached in the memory according to the number of occurrences.

16. The device according to claim 15, wherein the instructions to obtain the number of occurrences corresponding number to the target track segment image frame in the memory comprise instructions causing the processor to: for any one target track segment image frame in the memory, in response to the target track segment image frame being within a range of the first track segment image frames, the second track segment image frames, the third track segment image frames or the fourth track segment image frames, increase the number of occurrences corresponding to the target track segment image frame by N, N being a number greater than 0;

in response to the target track segment image frame being not within the range of the first track segment image frames, the second track segment image frames, the third track segment image frames or the fourth track segment image frames, decrease the number of occurrences corresponding to the target track segment image frame by N.

17. A non-transitory computer-readable storage medium on which computer-executable instructions stored, the computer-executable instructions when executed by a processor, cause the processor to:

determine a plurality of video track segments on a plurality of video editing tracks on a video editing interface;

determine cache priorities of track segment image frames of the plurality of video track segments, according to whether the plurality of video editing tracks are located in a display area of the video editing interface and the track segment image frames of the plurality of video track segments within a track timeline range of the display area; wherein the track segment image frames of the video track segments are displayed at track timeline positions in the video track segments corresponding to the track segment image frames;

determine a target track segment image frame from the track segment image frames of the plurality of video track segments based on the cache priorities and a cache frame configuration parameter, and caching the target track segment image frame.

18. The non-transitory computer-readable storage medium according to claim 17, wherein:

in response to the video editing track being located in the display area, a cache priority of first track segment image frames within the track timeline range of the display area in the video track segment of the video editing track is a first priority;

in response to the video editing track being located in the display area, a cache priority of second track segment image frames not within the track timeline range of the display area in the video track segment of the video editing track is a second priority;

in response to the video editing track being not in the display area, a cache priority of third track segment image frames within the track timeline range of the display area in the video track segment of the video editing track is a third priority;

in response to the video editing track being not in the display area, a cache priority of fourth track segment image frames not within the track timeline range of the display area in the video track segment of the video editing track is a fourth priority.

19. The non-transitory computer-readable storage medium according to claim 18, wherein the first priority is greater than the second priority, the second priority is greater than the third priority, and the third priority is greater than the fourth priority.

20. The non-transitory computer-readable storage medium according to claim 17, wherein the instructions to determine the target track segment image frame from the track segment image frames of the plurality of video track segments based on the cache priorities and the cache frame configuration parameter comprise instructions causing the processor to:

determine a first number of track segment image frames cacheable by an electronic device, based on the cache frame configuration parameter;

determine the target track segment image frame from the track segment image frames of the plurality of video track segments based on the cache priorities and the first number.

\* \* \* \* \*